Jan. 31, 1967   W. E. DONALDSON ET AL   3,301,187
CONSUMABLE MATERIALS
Filed March 31, 1965
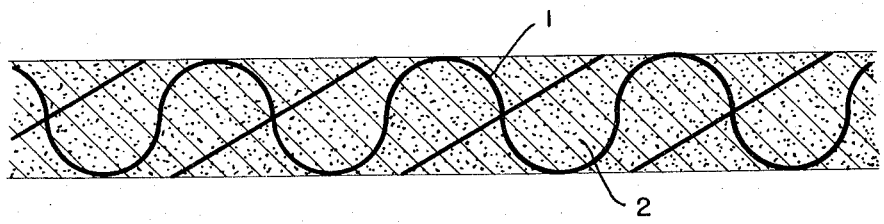
1. - MATRIX
2. - FORMULATION
INVENTORS.
WILLIAM E. DONALDSON
CARROLL W. BUTLER
ROSEMARY R. WHITMAN
HARRY B. PORTER

3,301,187
CONSUMABLE MATERIALS

William E. Donaldson, Carroll W. Butler, Rosemary R. Whitman, and Harry B. Porter, China Lake, Calif., assignors to the United States of America as represented by the Secretary of the Navy
Filed Mar. 31, 1965, Ser. No. 445,869
5 Claims. (Cl. 102—97)

The invention described herein may be manufactured and used by or for the Government of the United States of America for governmental purposes without the payment of any royalties thereon or therefor.

The present invention relates to novel consumable materials.

Consumable materials generally used in ordnance items today are shell liners and case liners composed of materials which burn rapidly under high pressure, but very slowly at atmospheric pressure. Although such materials have served their purpose, they have not proved satisfactory for use at atmospheric pressure or lower. This invention is for improved consumable materials which are versatile and can be tailored to fit the requirements of structural designs used in modern weapon devices.

It is an object of the present invention to provide a material which will burn rapidly at atmospheric pressure or below.

Another object is to provide a completely consumable material for use in a non-injurious delivery system.

Still another object of the present invention is to provide a consumable material which can be inexpensively and easily manufactured using standard equipment and processing methods.

A further object is to provide a consumable material which can be formed and shaped into any type ordnance item to meet specific requirements.

Other objects, features, and many of the attendant advantages of this invention will become readily appreciated as the same become better understood by reference to the following detailed description when considered in connection with the accompanying drawing wherein:

The single figure is an enlarged diagrammatic section with identifying legend of a preferred embodiment of the present invention which is described in detail below.

The consumable material of this invention comprises one or more layers of a matrix or reinforcement impregnated with a formulation consisting essentially of an epoxy resin or a polyester resin and an inorganic oxidizer to which a light metal powder and a curing agent may be added. The matrix or reinforcement may be nylon, glass, cotton, paper and the like. The formulation is dependent upon the type structure for which the material is to be used, the burning rate required, the physical strength, and the environmental operating conditions of the end product.

The following examples represent formulations preferred for the preparation of the consumable materials of this invention.

Example I

Ingredients: Percent by weight
Epoxy resin _____ 50
Ammonium perchlorate _____ 30
Potassium nitrate _____ 20

The ingredients were blended together with the aid of a few drops of acetone to form a liquid paste. Lightweight glass cloth and a heavy-gage cotton (canvas) were treated on both sides with sufficient of the paste to provide thorough impregnation. The materials were cured at room temperature, then oven-cured at 160° F. for about 4 hours. On burning the glass cloth showed greater embrittlement than the canvas which left only fine ashes. This has been attributed to the high specific surface of the lightweight glass cloth and to the carbon deposited on the glass. The carbon coating is thought to protect the glass from the heat released by combustion.

The epoxy resin used in the above formulation is sold by Shell Chemical Company under the tradename Epon 828 and comprises aromatic diepoxides plus a reactive diluent, glycidyl ether. Its viscosity is 10,000–20,000 cps. at 73° F. and it has an epoxide equivalent weight of 175–210.

This formulation produced good burning characteristics. It is not easily extinguished by an air blast, even from a compressed air hose (30 p.s.i.) at a distance of two feet. When burning does stop, the material reignites when the air blast is discontinued. The major problem with this formulation, however, lies in curing. The use of sufficient room-cure catalyst causes a high exotherm; less catalyst makes cure time excessive; low heat cure catalysts (150° F.) are most satisfactory. Approximately 6 parts of the catalyst, diethylenetriamine, per 100 parts resin seems to bring about a satisfactory curing time. It was noticed that when the resin-oxidizer formulation is not properly used it burns with smoky flame, producing small flakes of soot which float about in the air.

Example II

Ingredients: Percent by weight
Epoxy resin _____ 50
Ammonium perchlorate _____ 43
Magnesium (3–5$\mu$) _____ 7

The ingredients were blended into a liquid paste in a disposable container. A number of laminate specimens were prepared and tested for burning rate and autoignition point. All were cured at room temperature, then oven-cured at 160° F. for about 4 hours. The room temperature cure was made under low pressure produced by weights. Too high a pressure squeezes the formulation out of the fabric, thereby reducing the burning rate. Samples of consumable materials were made as follows:

Sample 1.—Cotton cloth, very absorbent and containing no sizing (similar to bird's-eye cloth) was saturated with the formulation then cured.

Sample 2.—Cotton cloth, very absorbent, saturated first in a water solution of ammonium perchlorate, air-dried, impregnated with the formulation, then cured.

Sample 3.—Cotton diaper cloth (bird's-eye) soaked first in a saturated acetone solution of ammonium perchlorate, air-dried, impregnated with the formulation, then cured.

Sample 4.—Alternate layers of 4-mil glass cloth and cotton cloth were first soaked in a water solution of ammonium perchlorate then saturated with the formulation and cured.

Sample 5.—Kraft paper was impregnated with the formulation then cured.

The following table gives the autoignition temperatures and burning rates of the samples.

TABLE I

| Sample | Autoignition point, ° F. | Average burning rate | Average pressure (p.s.i.a.) |
|---|---|---|---|
| 1 | 485 | | |
| 2 | 477 | | |
| 3 | 470 | 0.0363 | 46 |
| 4 | 476 | 0.0476 | 44 |
| 5 | 471 | | |

Example III

Ingredients: Percent by weight
Epoxy resin _____ 40
Ammonium perchlorate _____ 60

These ingredients were blended into a paste-like mixture. The resin used herein is sold under the tradename Epon 815 and comprises bisphenol A, epichlorohydrin and butyl glycidyl ether. Other low molecular weight epoxy resins may be used. This formulation was used to impregnate 4-mil glass cloth. The sample showed an autoignition point of 485° F. and an average burning rate of 0.0582 at 46 p.s.i.a.

Other reinforcements or matrices similarly treated with this resin-oxidizer formulation to form consumable laminates or materials included nylon and cotton. Cotton cloth was impregnated most easily; the nylon least easily. All the materials (cotton, nylon and glass) on burning were reduced to a brittle char which crumbled when touched. The cotton and nylon residue could be broken with a strong breath; the glass required touching to break it. It was observed that specimens made with ammonium perchlorate as received in shipment, in which there had been some settling during curing, burned at different rates in a multilayered laminate specimens. The oxidizer-rich layer burned rapidly, with a white, intense flame; the oxidizer-lean layer burned more slowly with a yellowish flame and dense smoke. The burning characteristic was not the same for all layers. The oxidizer-rich layer burned clean; the oxidizer-lean area charred, curled over with the heat, and was eventually consumed. Observation indicated that the combustion was steadier in those formulations using micropulverized ammonium perchlorate than that with the coarser oxidizer, although the total burning times differed only by a few seconds.

*Example IV*

| Ingredients: | Parts by weight |
|---|---|
| Epoxy resin | 50 |
| Ammonium perchlorate (5 to 15$\mu$) | 43 |
| Magnesium powder (5–15$\mu$) | 7 |
| Diethylenetriamine | 10 |

The formulation was processed by blending the resin and oxidizer, then stirring in the metal powder, and finally the curing agent which increases the pot life at room temperature and speeds up the curing process.

This formulation produced fast burning at atmospheric pressure, was easily processed, and safe to handle. The resin used had an epoxide equivalent of 175–210 and a viscosity of 5–9 poises at 25° C. It comprises biphenol A, epichlorohydrin and butyl glycidyl ether. The ammonium perchlorate crystals ranging in size from 5 to 15 microns give a steadier and less erratic rate of combustion and produce more homogeneous mixes. The fine magnesium powder improved the formulations consisting essentially of oxidizer and resin from the standpoint of high temperature, burning rate and persistence of burning. The curing agent, diethylenetriamine, reduced the curing time considerably. This formulation using a combustible matrix such as cotton cloth either as laminates or moldings were successfully used for nonlethal delivery systems.

In order to load the resin with the optimum amount of oxidizer the addition of a diluent such as allyl glycidyl ether to the resin will aid in achieving the desired fluidity.

The major factors involved in forming the consumable material of this invention include, in addition to the new formulations, the matrices or reinforcements, the laminating pressure, and the curing cycle. The formulations have been disclosed herein as well as some of the matrices which together formed the novel consumable material. The matrices included paper, nylon, fiberglass, and cotton, especially the absorbent type, and canvas. Other fibers could no doubt be used as the specific type weave dictates, to some degree, the formulation to be applied in order to achieve the ultimate properties of the material or laminate. The majority of the consumable materials of this invention were produced at low pressure ranging from 10 to 100 p.s.i. This low pressure produced a dense void-free fill with a formulation content in the neighborhood of from 50 to 60 percent. The curing cycle is somewhat more complex than that for castings, coatings and adhesives. It was achieved herein in two stages; precure at room temperature, and postcure in an oven at elevated temperatures.

Several of the consumable materials disclosed herein were rolled into circular tubes for rocket motor castings and allowed to B-stage cure at room temperature. The tubes were then placed in a rubber bag which was put in an isostatic press at 2000 p.s.i. at about 160° F. Under these conditions the formulation was not squeezed out of the laminate. The tubes were finally cured under pressure for about 4 hours at a gradually declining temperature. Generally, there was an improvement in the density of material. An additional oven cure without pressure for about 8 hours will give more complete polymerization.

The material produced is strong and pliable and can be molded into any desired shape. It will burn rapidly at atmospheric pressure or below and is consumable to such a degree that the matter remaining after the combustion process resembles a flaky ash which breaks into fine particles upon touching.

Moldings can be prepared using chopped fabric such as nylon, cotton and such, for reinforcing the formulations. Also monofilament wound structures could be prepared using a combustible monofilament.

Obviously many modifications and variations of the present invention are possible in the light of the above teachings. It is therefore to be understood that within the scope of the appended claims the invention may be practiced otherwise than as specifically described.

What is claimed is:

1. A consumable material comprising a cloth matrix selected from a member consisting of fiberglass, nylon, cotton cloth and paper impregnated with a formulation consisting essentially of:

| | Percent by weight |
|---|---|
| Epoxy resin | 50 |
| Ammonium perchlorate | 43 |
| Magnesium | 7 | said resin consisting of bisphenol A, epichlorohydrin and butyl glycidyl ether.

2. The material of claim 1 wherein the matrix is nylon.
3. The material of claim 1 wherein the matrix is absorbent cotton cloth.
4. The material of claim 1 wherein the matrix is paper.
5. A consumable material comprising a plurality of layers of cotton cloth impregnated with a formulation consisting essentially of

| | Percent by weight |
|---|---|
| Epoxy resin | 50 |
| Ammonium perchlorate | 43 |
| Magnesium | 7 | said resin consisting of bisphenol A, epichlorohydrin and butyl glycidyl ether.

References Cited by the Examiner

UNITED STATES PATENTS

| 2,405,104 | 7/1946 | Mydans | 102—97 |
| 2,986,092 | 5/1961 | Murphey | 102—98 |
| 3,159,104 | 12/1964 | Hodgson | 102—98 |
| 3,213,793 | 10/1965 | Dratz | 102—98 |

References Cited by the Applicant

UNITED STATES PATENTS

| 2,977,885 | 4/1961 | Perry et al. |
| 3,017,836 | 1/1962 | Guay. |
| 3,032,970 | 5/1962 | Fox. |

BENJAMIN A. BORCHELT, *Primary Examiner.*

ROBERT F. STAHL, *Examiner.*

S. W. ENGLE, *Assistant Examiner.*